(12) United States Patent  
Pährisch et al.

(10) Patent No.: US 6,877,596 B2  
(45) Date of Patent: Apr. 12, 2005

(54) DIAPHRAGM SPRING FOR A FRICTION CLUTCH

(75) Inventors: Martin Pährisch, Hallstadt (DE); Ronald Beck, Thundorf-Rothhausen (DE); Alfred Schraut, Waigolshausen (DE); Erwin Ziegler, Gressthal (DE); Frank Hirschmann, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/638,457

(22) Filed: Aug. 11, 2003

(65) Prior Publication Data

US 2004/0069588 A1 Apr. 15, 2004

(30) Foreign Application Priority Data

Aug. 10, 2002 (DE) .......................................... 102 36 809

(51) Int. Cl.[7] ................................................ F16D 13/71
(52) U.S. Cl. ................................ 192/70.25; 192/70.27; 192/89.23; 192/111 R
(58) Field of Search ......................... 192/70.25, 70.27, 192/89.23, 111 R, 111 A

(56) References Cited

U.S. PATENT DOCUMENTS

| 4,241,819 | A |   | 12/1980 | Babcock et al. |          |
|-----------|---|---|---------|----------------|----------|
| 4,601,376 | A | * | 7/1986  | Reik ........................ | 192/89.24 |
| 4,618,047 | A | * | 10/1986 | Kinz ........................ | 192/89.23 |
| 4,629,048 | A |   | 12/1986 | Draper et al.  |          |
| 4,667,793 | A | * | 5/1987  | Kunz et al. .............. | 192/70.12 |
| 4,747,586 | A |   | 5/1988  | Reik           |          |
| 4,770,282 | A | * | 9/1988  | Maycock et al. ........ | 192/70.27 |
| 5,400,888 | A |   | 3/1995  | Hernandez      |          |
| 5,560,463 | A | * | 10/1996 | Link et al. ................ | 192/70.25 |

* cited by examiner

Primary Examiner—Saul Rodriguez  
(74) Attorney, Agent, or Firm—Cohen, Pontani, Lieberman & Pavane

(57) ABSTRACT

A diaphragm spring for a friction clutch includes a ring-like body area and a plurality of spring tongues arranged in a row in the circumferential direction and extending radially inward from the body area. A stiffening rib formed in at least one of the spring tongues extends radially into the body area.

7 Claims, 5 Drawing Sheets

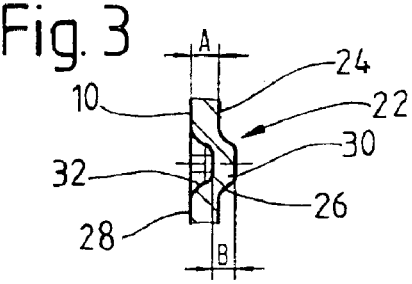
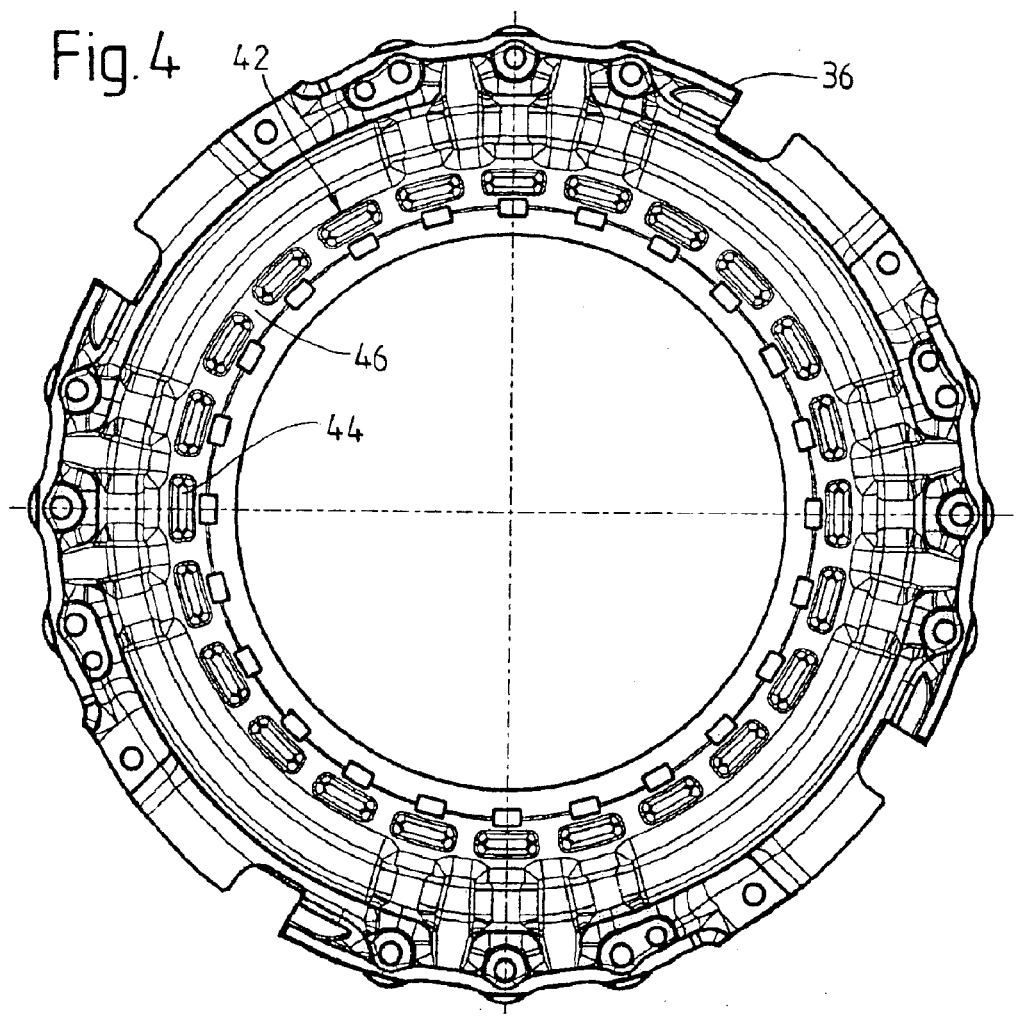

DIAPHRAGM SPRING FOR A FRICTION CLUTCH

BACKGROUND OF THE INVENTION

1. Field of the Invention

The present invention relates to a diaphragm spring for a friction clutch comprising a ring-like body area and a plurality of spring tongues, that are arranged in a row in the circumferential direction and extend radially inward from the body area.

2. Description of the Related Art

These types of diaphragm springs are used in friction clutches, and they are usually actuated at the radially inner end of their spring tongues by a clutch-release mechanism, so that, as a result of the existing lever relationships and the support of the diaphragm spring against a housing arrangement of the friction clutch, the force being exerted by the diaphragm spring on a pressure plate can be released. Because the diaphragm springs are usually made out of spring steel and thus have a certain elastic deformability as an intrinsic characteristic, deformations in the area of the spring tongues occur during the clutch-release process. Work must therefore be performed during this process in opposition to the intrinsic pretension of the diaphragm spring. In cases where the release distance is defined, these deformation reduce the extent to which the area of the diaphragm spring which exerts force on the pressure plate can be lifted off the pressure plate.

It is therefore known that ribs can be created in the spring tongues of these types of diaphragm springs, which ribs are formed by stamping or shaping the spring steel blank, so that essentially radially oriented pleats or elevations are formed in the spring tongues. These ribs are limited in the radial direction to prevent them from interfering with the support of the spring against the housing arrangement or against the pressure plate arrangement.

SUMMARY OF THE INVENTION

The object of the present invention is to provide a diaphragm spring, i.e., a pressure plate assembly for a friction clutch equipped with such a diaphragm spring, with which it is possible to counteract the bending of the spring tongues of the diaphragm spring induced during actuating processes.

According to a first aspect of the present invention, in the area of at least one spring tongue, at least one elongated rib is provided, which extends into the inner radial area of the ring-like body area.

In the diaphragm spring according to the invention, therefore, the ribs extend not only along the radial area of the spring tongues, but also all the way into the radial area of the ring-like body area, so that the spring tongues have increased stiffness especially in the area of the transition between the spring tongues and the ring-like body area. This is important especially because the openings which separate the individual spring tongues from each other in the circumferential direction are often expanded in the circumferential direction in this transition area, and to this extent the circumferential dimension of the spring tongues themselves and thus also their strength are reduced here.

With respect to the stiffness achievable in the case of diaphragm spring tongues, it has been found advisable for a thickness A of the diaphragm spring material outside of the at least one rib and the thickness B of the diaphragm spring material in the area of the at least one rib, preferably in the crest area of the rib, to be in a ratio of B/A=0.7–0.9.

For example, the minimum of one rib can extend essentially over the entire radial area of the ring-like body area. In addition, the spring tongues can be made very stiff by providing the at least one rib in the area of the ring-like body area with at least two rib sections adjacent to each other in the circumferential direction.

According to another aspect of the present invention, the invention relates to a pressure plate assembly for a friction clutch comprising a housing arrangement and a pressure plate arrangement, that is connected to the housing arrangement for rotation in common around an axis of rotation and which can be shifted with respect to the housing arrangement in a direction parallel to the axis of rotation, wherein a diaphragm spring according to the invention is supported against the housing arrangement on one side and against the pressure plate arrangement on the other.

In the embodiment of the diaphragm spring according to the present invention, it is quite possible for the rib to be present in a radial area where support against the housing arrangement or against the pressure plate arrangement is also provided. It is therefore proposed that a support area with a recess which accepts the at least one rib be provided on the side of the assembly against which the at least one projecting rib of the diaphragm spring is supported.

As an alternative, to prevent interference between the at least one rib area and an area which supports the diaphragm spring, areas of the diaphragm from which no rib projects may be used to support it against the housing arrangement and against the pressure plate assembly.

The diaphragm spring can be supported against the pressure plate arrangement using, for example, a wear take-up device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 is a detailed cross-sectional view of the diaphragm spring shown in FIG. 1 in the area of a rib, cut along line III—III of FIG. 1;

FIG. 4 is an axial view of the housing used in the pressure plate assembly of FIG. 2;

DETAILED DESCRIPTION OF THE PRESENTLY PREFERRED EMBODIMENTS

Figure 1:
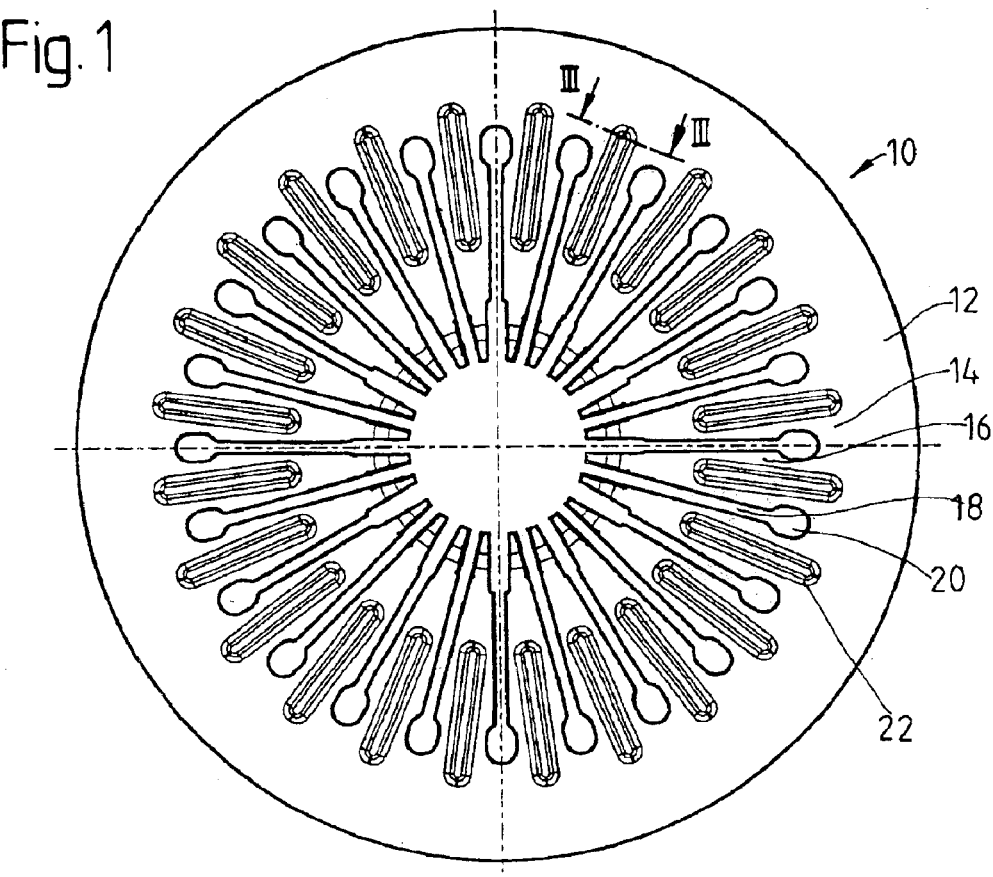
FIG. 1 is an axial view of a diaphragm spring according to the invention.

FIG. 1 shows a diaphragm spring 10 according to the invention. The diaphragm spring 10 has a ring-like, circumferential body area 12 in its radially outer area. In the radially inner area 14 of this body area 12 and the adjoining body area, several spring tongues 16 are arranged in a row in the circumferential direction. The individual spring tongues 16 are separated from each other by openings 18, which are expanded in the circumferential direction at their radially outer ends 20, as a result of which a configuration is obtained in which the part of the spring tongues 16 adjoining the radially inner area 14 of the body area 12 is comparatively narrow in the circumferential direction. In the case of the diaphragm spring 10 shown in FIG. 1, a rib 22 is provided in the area of each spring tongue 16. The ribs 22, which can be produced in general by the deformation of the sheet steel blank used for the diaphragm spring 10, thus form, as can be seen in FIG. 3, respective elevations 26 on one side 24 of the diaphragm spring 10, and pleat-like depressions 32 on the other side 28. The ribs 22 are present not only in the radial area of the spring tongues 16, but also extend radially outward beyond the spring tongues 16 and into the ring-like body area 12. In the exemplary design shown in FIG. 1, the essentially radially elongated ribs 22 extend into the radially inner area 14 of the ring-like body area 16.

The presence of these ribs 22 ensures that extra stiffening is provided, especially in the area in which the spring tongues 16 are weakened by comparatively narrow sections of material. The deformations induced in the area of the spring tongues 16 during the performance of actuating processes, deformations which ultimately mean a loss of clutch-release distance, i.e., a loss of stroke distance, can thus be considerably reduced. It has been found in particular that especially good stiffness properties can be achieved by shaping the ribs 22 which are made in the material blank of the diaphragm spring 10 in such a way that the thickness A of the material blank in general and the thickness B of the material in the area of the ribs 22, especially in the crest area 30 of those ribs, is in a ratio of B/A=0.7–0.9.

Figure 2:
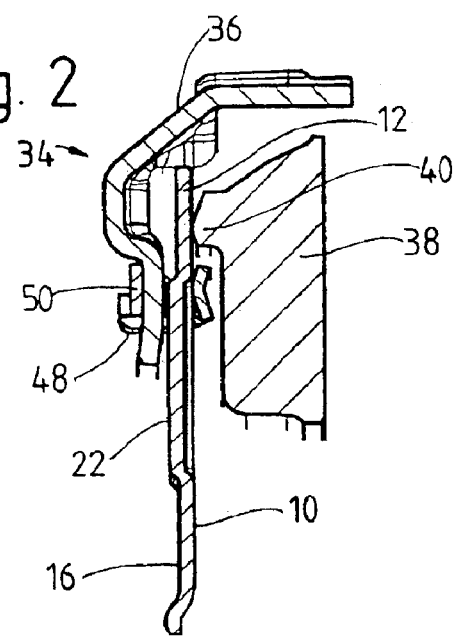
FIG. 2 is a partial longitudinal cross-sectional view through a pressure plate assembly equipped with the diaphragm spring of FIG. 1.

FIG. 2 shows the diaphragm spring 10 according to the invention installed in a pressure plate assembly 34. The pressure plate assembly 34 includes a housing 36, in which a pressure plate 38 is mounted in such a way that it can rotate together with the housing 36 around an axis of rotation X and can be shifted axially to a limited extent with respect to the housing 36 in a direction parallel to the axis of rotation X. The pressure plate 38 has a ring-like or sectional support area 40, extending circumferentially around the axis of rotation X, against which the radially outer area, that is, the ring-like body area 12, of the diaphragm spring 10 is supported and thus exerts force on the pressure plate 38. Radially farther inward, the diaphragm spring 10 is supported against the housing 36. FIG. 4 shows an axial view of this housing 36. A support area 42 is also formed there for the diaphragm spring 10. This area includes a plurality of supporting projections 44 arranged in a row in the circumferential direction. Between every two supporting projections 44, a recess 46 is formed. The ribs 22 of the diaphragm spring 10 engage in these recesses 46, so that the diaphragm spring 10 is supported against the housing 36 essentially only in the area of the projections 44. As a result, in spite of the fact that the ribs 22 are also located in the area in which the force storage device 10 is supported against the housing 36, no additional construction space is required. The diaphragm spring 10 can be held on the housing 36 by one or more clamp-like elements 48, which pass through the radially outer areas 20 of the openings 18 and grip the diaphragm spring 10 on one side and the housing 36 on the other (as shown in FIG. 2). Between the clamp elements 48 and the housing 36, it is possible to install a disk spring 50 or the like to compensate for the wear which occurs in the area of the support of the diaphragm spring 10 with respect to the housing 36, i.e., to ensure a solid connection even after wear has occurred.

Figure 6:
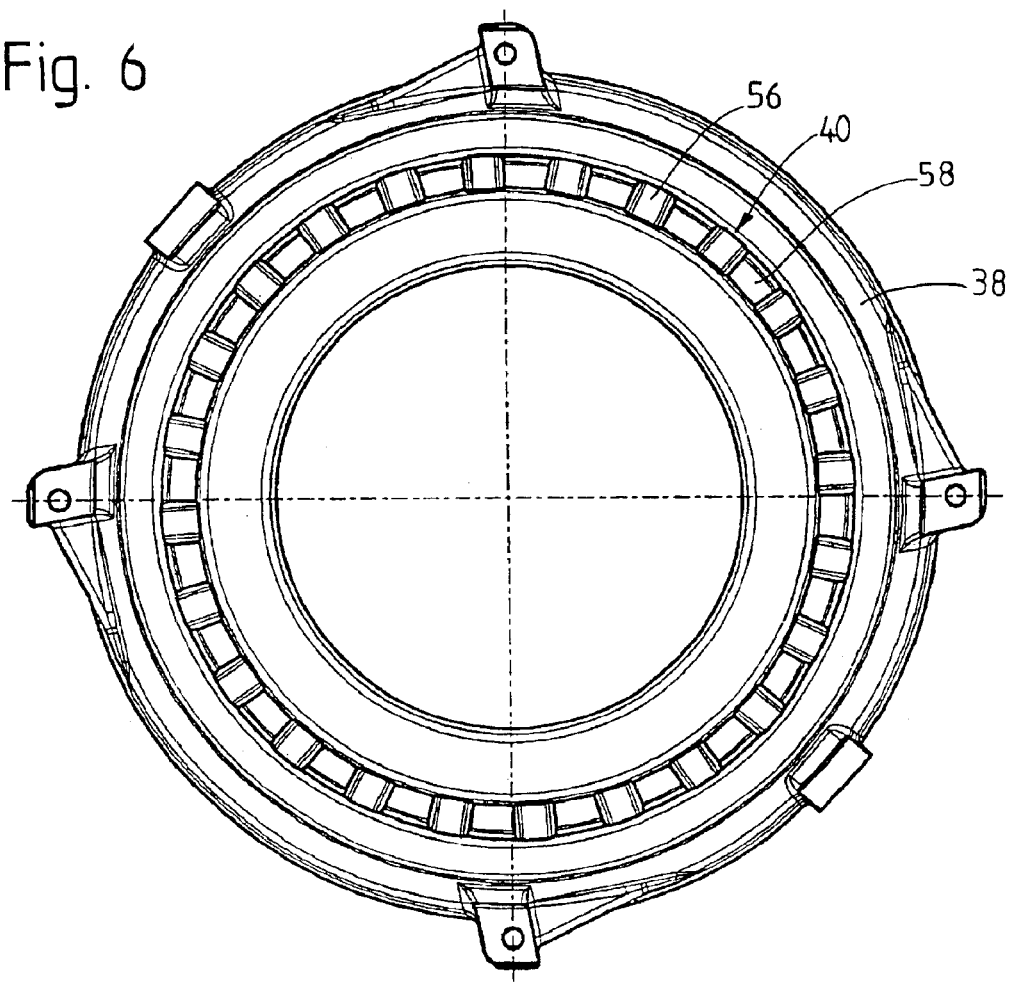
FIG. 6 is an axial view of the pressure plate used in FIG. 5.
Figure 5:
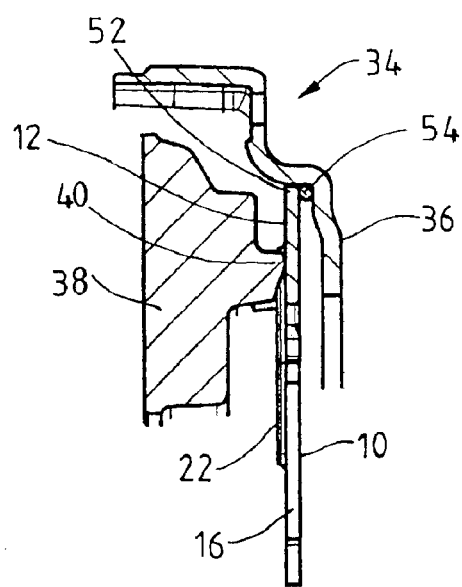
FIG. 5 is a view, similar to that of FIG. 2, of an alternative design of a pressure plate assembly.

Whereas, in the case of the pressure plate assembly 34 described above with reference to FIGS. 2 and 4, a design of the pushed type has been provided, that is, a design in which the radially inner parts of the spring tongues 16 are actuated by a pushing type of force so as to pivot the radially outer body area 12 of the diaphragm spring 10 away from the pressure plate 38, FIGS. 5 and 6 show an arrangement in which a diaphragm spring 10 according to the invention is used in a pressure plate assembly 34 of the pulled type. Here, therefore, the radially outer area 52 of the body area 12 of the diaphragm spring 10 is supported by a wire ring 54 or the like against the housing 36, whereas radially farther inward the diaphragm spring 10 exerts force on the support area 40 of the pressure plate 38. FIG. 6 shows an axial view of this pressure plate 38. It can be seen that the support area 40 of the plate includes a plurality of supporting projections 56 arranged in a row in the circumferential direction, between which recesses 58 are again formed. The ribs 22 provided on the spring tongues 16 again come to lie in these recesses 58, so that here, too, the support occurs essentially in the area of the projections 56 and not in the area of the ribs 22. Here again, an arrangement is provided according to which the ribs 22 extend into the area where support against the pressure plate 38 is provided without the need for any additional axial room.

FIG. 7 shows again a pressure plate assembly 38 of the pushed type, in which the radially outer part of the body area 12 of the diaphragm spring 10 exerts force on the pressure plate 38 by way of a wear take-up device 60. The wear take-up device 60 can be of conventional design and have, for example, two take-up rings 62, 64, which can rotate in the circumferential direction relative to each other, and which rest against each other along wedge-like or ramp-like surfaces. At least one of the take-up rings 62, 64 is acted upon by the pretensioning spring 66, which tries to rotate this one ring in the circumferential direction with respect to the other ring. By detection of the wear of the friction linings (not shown) of a clutch disk, such as by detection of the axial displacement of the pressure plate 38 relative to the housing 36 or relative to a flywheel (not shown), the take-up rings 62, 64 of the wear take-up device 60 are allowed to rotate relative to each other during a clutch-release operation, this movement being accompanied by a clearance sensor (also not shown), until the amount of wear previously detected by the clearance sensor has been taken up, that is, until the wear take-up device 60 has increased its axial dimension approximately to the same extent that the previously detected thickness of the friction linings has decreased.

Figure 7:
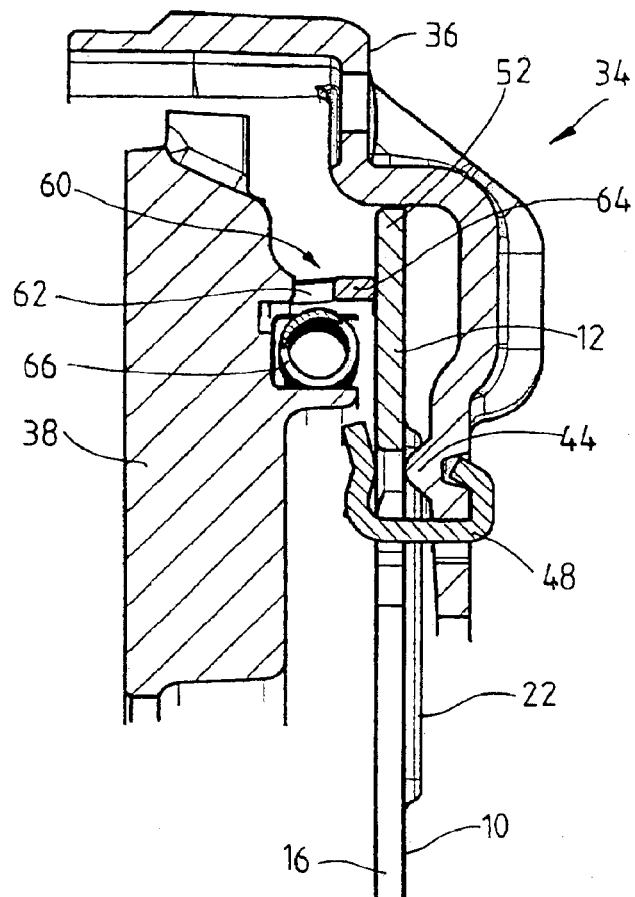
FIG. 7 is a partial cross-sectional view similar to that of FIG. 2 of an alternative design of a pressure plate assembly.

It can also be seen in the embodiment shown in FIG. 7 that the diaphragm spring 10 is supported against the housing 36 in the radial area in which also the ribs 22 are provided, where again the individual supporting projections 44 ensure that the ribs 22 can engage in the recesses formed between these projections 44.

Figure 8:
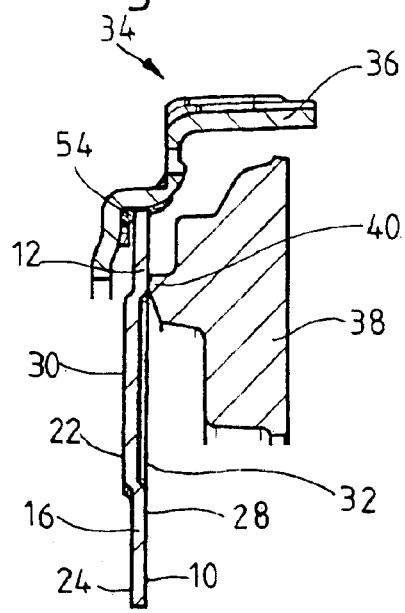
FIG. 8 is a partial cross-sectional view similar to that of FIG. 2 of an alternative design of a pressure plate assembly.

FIG. 8 shows an embodiment of a pulled pressure plate assembly 34. The diaphragm spring 10 in the pressure plate assembly 34 shown in FIG. 8 is installed in such a way that the side 24 of the device on which the ribs 22 form the elevations 26 faces toward the housing 36 and away from the pressure plate 38. This means that the side 28, on which the ribs 22 form the depressions 32 previously shown in FIG. 3, face toward the pressure plate 38. There is now no longer any need to provide any special measures on the pressure plate 38 or on the housing 36 to prevent interference between them and the ribs 22 with respect to the absorption of the axial forces. Instead, it is possible here as well to provide a continuous, ring-like support area 40 on the pressure plate 38, which makes no contact with the depressed areas 32.

Figure 9:
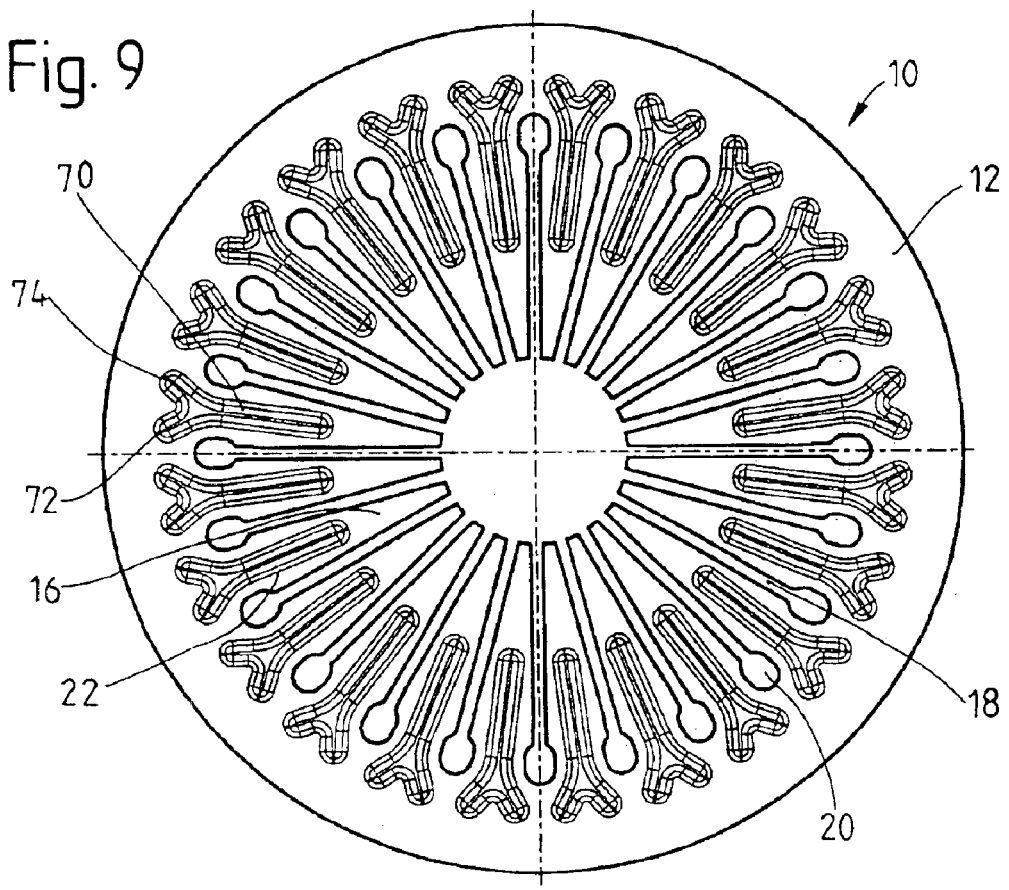
FIG. 9 shows an axial view of a diaphragm spring according to an alternative design.
Figure 10:
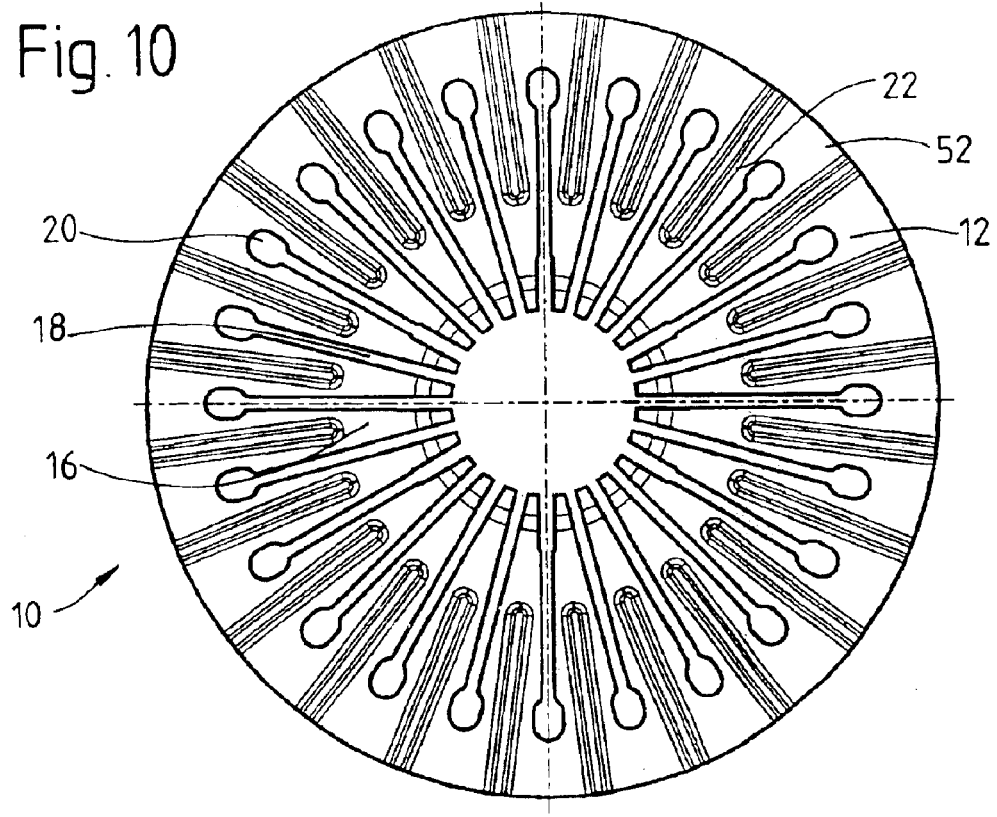
FIG. 10 shows an axial view of a diaphragm spring according to an alternative design.

FIGS. 9 and 10 show additional, alternative diaphragm springs according to the invention. In the case of the variant shown in FIG. 9, the ribs 22 have a Y-shaped contour from an axial perspective with an approximately radially oriented section 70 in the area of the spring tongues 16, adjoined radially on the outside by two sections 72, 74, which are adjacent to each other in the circumferential direction and at an angle to each other. Here, too, therefore, the ribs 22 extend into the radially inner area of the ring-like body area 12.

In the variant shown in FIG. 10, the ribs 22 are lengthened radially toward the outside in comparison with the variant shown in FIG. 1, extending up as far as the radially outer area 52 of the ring-like body area 12, at which point they can also have radial openings toward the outside, for example.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A diaphragm spring for a friction clutch, comprising:
   a ring-like body area;
   a plurality of spring tongues extending radially inward from said body area; and
   at least one stiffening rib formed in a respective at least one of said spring tongues and extending radially into said body area, each said stiffening rib comprising two circumferentially adjacent rib sections in said body area, said rib being forked where said rib extends into said body area.

2. A diaphragm spring as in claim 1 wherein said diaphragm spring has a material thickness A outside of said at least one rib, said rib having a crest with a material thickness B, wherein B/A is 0.7–0.9.

3. A diaphragm spring as in claim 1 wherein said at least one rib extends essentially entirely across said body area radially.

4. A pressure plate assembly for a friction clutch, comprising:
   a housing;
   a pressure plate mounted in said housing for rotation in common about an axis of rotation, said pressure plate being axially movable with respect to said housing; and
   a diaphragm spring which loads said pressure plate axially away from said housing, said diaphragm spring comprising a ring-like body area, a plurality of spring tongues extending radially inward from said body area, and at least one stiffening rib formed in a respective at least one of said spring tongues and extending radially into said body area, each said stiffening rib comprising two circumferentially adjacent rib sections in said body area, said rib being forked where said rib extends into said body area.

5. A pressure plate assembly as in claim 4 wherein one of said housing and said pressure plate comprises a support area formed with at least one recess, each said at least one recess receiving a respective said at least one stiffening rib.

6. A pressure plate assembly as in claim 4 wherein said diaphragm spring has areas without ribs, said areas being supported against said housing and said pressure plate.

7. A pressure plate assembly as in claim 4 further comprising a wear take-up device which supports the diaphragm spring against the pressure plate.

* * * * *